July 24, 1928.

H. G. PROSSER 1,677,930

WRITING PAPER

Filed Sept. 6, 1927

INVENTOR
Henry G. Prosser
BY Chappell & Earl
ATTORNEYS

Patented July 24, 1928.

1,677,930

UNITED STATES PATENT OFFICE.

HENRY G. PROSSER, OF CHICAGO, ILLINOIS, ASSIGNOR TO BERMINGHAM AND PROSSER CO., OF KALAMAZOO, MICHIGAN.

WRITING PAPER.

Application filed September 6, 1927. Serial No. 217,672.

The main object of this invention is to provide an improved writing paper for use in schools and in teaching writing which greatly facilitates the examination or criticism of the writing.

A further object is to provide a writing sheet having these advantages which is economical to produce.

The invention is defined and pointed out in the claims.

A structure which is a preferred embodiment of my invention is illustrated in the accompanying drawing, forming a part of this application, in which.

Figure 1:
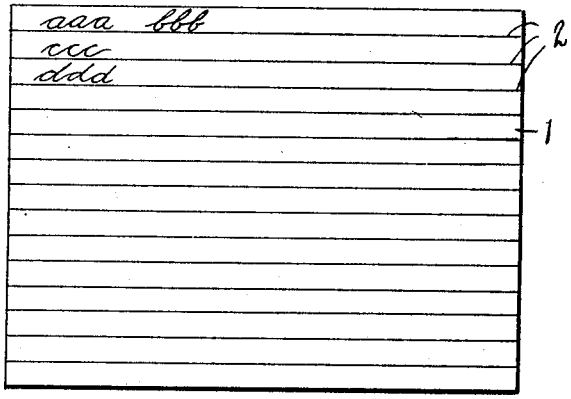
Fig. 1 is a plan view of a sheet of my improved writing paper as it appears when resting upon a surface to permit writing thereon, certain letters having been written on the sheet.
Figure 2:
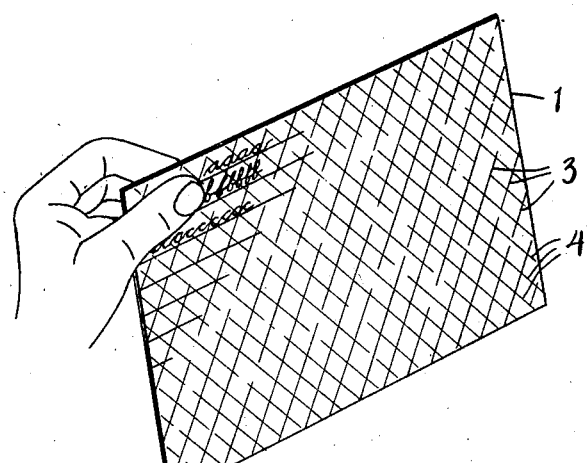
Fig. 2 is a perspective view with only a portion of the parallel writing lines represented, of a sheet of my improved writing paper supported to permit the passage of light therethrough to render distinctly visible the diagonally disposed watermark lines.

The sheets illustrated in Figs. 1 and 2 are of reduced size and no particular attention being given to exact proportions, the writing for instance being out of proportion to the spacing of the lines in the sheets as prepared for the market, the line spacing being substantially greater in the writing sheets as they are preferably used.

Referring to the drawing, the sheet 1 has a series of distinct horizontal parallel lines 2 on each side thereof, these lines being produced by ruling or printing and are preferably in color.

There are two series of indistinct lines designated by the numerals 3 and 4 in Fig. 2, the lines of the series being disposed parallel and diagonally of the sheet in crossing relation to each other and at the same angle relative to the horizontal lines 2.

The lines 3 and 4 are produced as watermarks in the sheet and are distinctly visible only when the sheet is supported to permit light to pass therethrough. This permits the use of the sheet by students, the writing being upon the lines 2 as is indicated in Figs. 1 and 2, the lines 3 and 4 being clearly visible only when the sheet is held up to the light, and do not interfere with the forming of the letters or serve particularly to guide the forming of the letters; at the same time when the sheet is held up to the light the inspector or instructor can readily determine whether the letters have the proper slant or correct proportions.

By providing the two sets or series of indistinct diagonal lines and ruling both sides of the sheet, the one set of diagonal lines serves to check the writing on one side of the sheet while the other set of diagonal lines serves to check the writing on the opposite side of the sheet.

My improved writing sheets greatly facilitate the checking or criticism of the writing as the instructor may determine almost at a glance whether the writing is of the correct slant and the checking of other features of the writing is also facilitated.

Having thus described my invention, what I claim as new and desire to secure by Letters Patent, is:

1. As an article of manufacture, a sheet of writing paper having a plurality of distinct horizontal parallel lines thereon, and a plurality of indistinct parallel diagonal lines disposed in crossing relation relative to the distinct lines, the indistinct lines being watermarks and becoming distinct when the sheet is supported to permit light to pass therethrough.

2. As an article of manufacture, a sheet of writing paper having a plurality of distinct horizontal parallel lines and two series of indistinct diagonal lines disposed in crossing relation relative to each other, the indistinct lines being water marks and becoming distinct when the sheet is supported to permit light to pass therethrough.

In witnesss whereof, I have hereunto set my hand.

HENRY G. PROSSER.